(12) United States Patent
Philipp

(10) Patent No.: US 8,741,802 B2
(45) Date of Patent: Jun. 3, 2014

(54) METHOD FOR PRODUCING AN OIL BINDING AGENT

(75) Inventor: Franz-Josef Philipp, Forchtenstein (AT)

(73) Assignee: Commerzialbank Mattersburg IM Burgenland AG, Mattersburg (AT)

( * ) Notice: Subject to any disclaimer, the term of this patent is extended or adjusted under 35 U.S.C. 154(b) by 572 days.

(21) Appl. No.: 12/864,046

(22) PCT Filed: Mar. 9, 2009

(86) PCT No.: PCT/AT2009/000095
§ 371 (c)(1),
(2), (4) Date: Sep. 18, 2010

(87) PCT Pub. No.: WO2009/114881
PCT Pub. Date: Sep. 24, 2009

(65) Prior Publication Data
US 2011/0152065 A1    Jun. 23, 2011

(30) Foreign Application Priority Data
Mar. 17, 2008  (AT) .................... A 424/2008

(51) Int. Cl.
| | | |
|---|---|---|
| *B01J 20/00* | (2006.01) | |
| *B01J 29/04* | (2006.01) | |
| *B01J 29/87* | (2006.01) | |
| *B01J 20/30* | (2006.01) | |
| *B01J 20/20* | (2006.01) | |
| *B01J 20/28* | (2006.01) | |
| B01D 35/00 | (2006.01) | |
| B01D 35/14 | (2006.01) | |
| B01D 15/00 | (2006.01) | |

(52) U.S. Cl.
CPC ............ *B01J 20/3078* (2013.01); *B01J 20/305* (2013.01); *B01J 20/20* (2013.01); *B01J 20/28004* (2013.01); *B01D 15/00* (2013.01)
USPC .............................. 502/407; 502/60; 210/690

(58) Field of Classification Search
CPC ............ B01J 20/02; B01J 20/10; B01J 20/12; B01J 20/20; B01J 20/22; B01J 20/28004; B01J 20/3078; B01J 20/305; B01D 15/00
USPC ............... 502/60, 63, 72, 401, 407, 414, 518; 501/155, 150; 210/690, 691, 660; 423/712
See application file for complete search history.

(56) References Cited

U.S. PATENT DOCUMENTS

| | | | |
|---|---|---|---|
| 2,634,208 A | | 4/1953 | Miscall et al. |
| 3,855,152 A | | 12/1974 | Preus |
| 4,142,969 A | * | 3/1979 | Funk et al. ............... 210/680 |
| 5,207,830 A | * | 5/1993 | Cowan et al. ............. 106/672 |
| 5,888,345 A | * | 3/1999 | Knapick et al. ........... 162/109 |
| 7,247,601 B1 | * | 7/2007 | Hills et al. ................ 502/407 |
| 7,416,581 B2 | * | 8/2008 | Raetz et al. .................. 95/90 |
| 7,892,326 B2 | * | 2/2011 | Raetz et al. .................. 96/15 |
| 7,932,203 B2 | * | 4/2011 | Philipp ..................... 501/155 |
| 2006/0054023 A1 | * | 3/2006 | Raetz et al. ................. 96/134 |
| 2006/0198776 A1 | * | 9/2006 | Cross et al. ............... 423/210 |
| 2008/0271605 A1 | * | 11/2008 | Raetz et al. .................. 96/17 |
| 2009/0203514 A1 | | 8/2009 | Philipp |

FOREIGN PATENT DOCUMENTS

| | | |
|---|---|---|
| EP | 0353605 B | 2/1990 |
| JP | 61000284 A | 1/1986 |
| JP | 07265696 A | 10/1995 |

\* cited by examiner

*Primary Examiner* — Anthony J Zimmer
(74) *Attorney, Agent, or Firm* — Lucas & Mercanti, LLP; Jonathan Myers

(57) ABSTRACT

A method is disclosed for producing an oil binding agent, using highly porous natural siliceous material and organic-containing remaining material, wherein the highly porous natural siliceous material having an initial grain size of between 4 and 10 mm is mixed with the organic-containing remaining material and the mixture is calcined at a temperature between 520° C. and 550° C. and then comminuted to a grain size spectrum substantially ranging between 4 and 0.125 mm.

7 Claims, No Drawings

METHOD FOR PRODUCING AN OIL BINDING AGENT

CROSS REFERENCE TO RELATED APPLICATIONS

This application is the US national phase of PCT application PCT/AT2009/000095, filed 9 Mar. 2009, published 24 Sep. 2009 as WO2009/114881, and claiming the priority of Austrian patent application A424/2008 itself filed 17 Mar. 2008, whose entire disclosures are herewith incorporated by reference.

The invention relates to a method of making an oil-binding agent using highly porous natural silicate material and organic-containing residual material. The term "highly porous" designates materials with a pore volume of at least 60, preferably approximately 70 to 90%.

From WO 2007/085031 [US 2009/0203514], a method of making an oil-binding agent of granular open-porous structure with a silicate ceramic matrix by using recovered paper material and clay in the raw material is known where the raw material obtained by mixing and processed to form particles with an average diameter of 4 to 6 mm is dried and subsequently burnt at 950-1050° C.

This document discloses also that different oil binders are known from practice that consist of inorganic material, for example, of natural silicate origin such as diatomaceous earth or kieselguhr, or pumice stone.

EP 0 353 605 discloses the use of a mineral material, such as clay or clay minerals, for absorbing liquids, for example fluid fuels and lubricants such as gasoline and oil. Here, clay or clay minerals must be burnt at temperatures above 650° C. but below sintering temperature up to approximately 1200° C. to thereby destroy the clay mineral structure and to finally obtain a nonsintering, porous material. To increase the amount of open porosity, organic-containing porosifying agents can be added to the mineral material prior to the combustion process.

In JP 61000284 A (abstract), an oil-binding granulate is disclosed that is produced by granulating and drying a mixture of fine inorganic powder containing clay and organic binding agents. To increase the porosity of the only moderately capillary-porous granulate, saw dust, vermiculite or perlite can be added.

In the abstract of JP 07265696 A, an oil-binding agent is disclosed that is produced by mixing inorganic binding agents with dry, granulated recovered paper material and zeolite, and by subsequent drying. Specifically due to the high zeolite portion, this oil-binding agent, on the one hand, is expensive with respect to its production and, on the other, has only a limited field of application.

It is the object of the invention to provide a method of simple and cost-effective production of an oil-binding agent by is using highly porous natural silicate material and organic-containing residual material with the aim to give the final oil-binding agent a considerably increased total porosity compared to the porosity that it already has in the form of the highly porous material used as the essential starting constituent.

The solution of this object is according to the invention that the highly porous natural silicate material having an initial grain size between 4 and 10 mm is mixed with the organic-containing residual material, and the mixture is calcined at a temperature between 520 and 550° C. and is subsequently comminuted to a grain size spectrum substantially ranging between 4 and 0.125 mm.

A substantial process parameter of the combination of the individual process steps is the calcination temperature between 520 and 550° C. to which the mixture is exposed. This ensures that the pore structure of the used highly porous natural silicate material is not affected but rather results in an increased oil-binding ability of the oil-binding agent produced in this manner due to an accumulation of the residues of the burnt organic portion of the organic-containing residual material on the highly porous silicate material. Moreover, the highly organic residual material allows the calcination of the oil binder with very low additional energy consumption.

According to a feature of the invention, the highly porous natural silicate material and the organic-containing residual material is used in a weight ratio between 75:25 and 95:5 based on the weight of the dry matter prior to calcination.

The method according to the invention is further is characterized in that as highly porous natural silicate material, pumice stone, pumice granulate (lapili) and/or foam lava or foamy volcanic stone is used, and as organic-containing residual material, recovered paper material and/or sewage sludge is used.

According to a configuration of the method according to the invention, prior to calcination, zeolite and/or bentonite are admixed to the mixture in an amount of maximum 5% by weight based on the amount by weight of the mixture, which can be used for binding pollutants, if necessary.

According to the principle of the production method according to the invention, depending on the type of organic-containing or organic-rich residual material, the latter and the highly porous natural silicate material as the two starting constituents for the oil-binding agent to be produced are intensively mixed together in a mixer prior to calcination, which preferably takes place in a rotary-drum furnace, or are only placed together in the rotary-drum furnace and are mixed together by baking in the rotary-drum furnace. During baking, the fine-grained mineral portions of the organic-rich residual materials form fine-pored, strongly liquid-absorbing coatings on the grains of the silicate material component or corresponding matrix between the particles of the silicate material component if the component is present as fine-grained material, and if prior to calcination together with the organic-rich residual material, a granulate (of the desired grain size distribution) is produced.

Production of the desired grain size spectrum is carried out either by granulating the mixture prior to calcination or by milling the calcined product, if necessary by sieving and with dust extraction. According to the method according to the invention, the combustion temperature and the furnace atmosphere during calcination are set in such a manner that the decarbonization of existing $CaCO_3$-containing phases and the oxidation of chromium (compounds) into Cr VI are of no significance for the properties of the finished product—in compliance with the limit values according to the current standards.

Highly porous natural silicate materials such as, for example pumice, have a considerable oil-binding ability due to their porosity. Due to their mechanical strength, such materials allow the use of the oil binder on traffic surfaces.

Moreover, these materials can be used as supplements for raw material and (oil-saturated) as energy carrier.

The organic-rich residual material increases the oil-binding ability and serves at the same time as energy carrier that allows the calcination of the oil binder mixture with very low additional energy consumption only.

The oil-binding ability and also the bulk density depend on the type and amount of the used organic-containing residual material as well as the used natural silicate material component. An essential influence on these parameters has the grain size distribution of the finished product. In compliance with the standard for grain size distribution of the standard form of the oil binder of the type III/R according to LTwS-No. 27 (version dated June 1999), according to the variable (mixture ratio) already mentioned above, an oil-binding capacity between approximately 0.40 and 0.48 l per liter oil binder is given.

In comparison, it should be noted that, compared to the oil-binding agent produced according to the invention, raw natural pumice has an oil-binding capacity of approximately 0.32 l per liter.

Example for the production of oil-binding agents according to the invention:

Pumice with an initial grain size between 4 to 10 mm and recovered paper material are placed together in a rotary-drum furnace in a mass ratio based on the dry matter pumice: recovered paper material of 92:8 and are mixed together in the rotary-drum furnace by baking. During baking (calcination), the very fine-grained mineral portions of the organic-containing (-rich) residual material form fine-grained, strongly liquid-absorbing coatings on the pumice grains. The combustion temperature is between 520 and 550° C. This way, the organic material is completely burnt; however, the decarbonization of the mineral portion of the recovered paper material is largely avoided, which is important for the pH value of the eluate. After calcination, the desired grain size spectrum of the calcined product is produced by means of milling.

Properties of the oil-binding agent produced in such a manner:
Grain size parameters:
Coarse fraction>4 mm=<0.1% by weight
4-0.5 mm=52.0% by weight
0.5-0.125 mm=45.0% by weight
Fine grain fraction<0.125 mm=<3.0% by weight
Bulk density: 332 kg/m$^3$
Oil-binding capacity: 1 l oil-binding agent binds 0.40 l oil % by weight All limit values according to the Standard LTwS 27 in the version dated June 1999 are fulfilled for an oil binder type III.

The invention claimed is:

1. A method of making an oil-binding agent by using highly porous natural silicate material and organic-containing residual material having a grained mineral portion, the method comprising the steps of:
    placing together the highly porous natural silicate material having an initial grain size between 4 and 10 mm and the organic-containing residual material having a grained mineral portion in a rotary drum furnace,
    mixing the highly porous natural silicate material having an initial grain size between 4 and 10 mm and the organic-containing residual material having a grained mineral portion in the rotary drum furnace,
    calcining the mixture in the rotary drum furnace at a temperature between 520 and 550° C. to completely burn the organic-containing residual material having a grained mineral portion while avoiding decarbonization of the highly porous natural silicate material to obtain a calcined mixture wherein the grained mineral portion of the organic-containing residual material having a grained mineral portion forms a pored, liquid-absorbing coating on the grains of the highly porous natural silicate material, and subsequently comminuting the calcined mixture to a grain size spectrum ranging between 4 and 0.125 mm.

2. The method according to claim 1 wherein the highly porous natural silicate material and the organic-containing residual material having a grained mineral portion are used in a weight ratio between 75:25 and 95:5 based on the weight of the dry matter prior to calcination.

3. The method according to claim 1 wherein as highly porous natural silicate material, pumice, pumice stone or pumice granulate is used.

4. The method according to claim 1 wherein as highly porous natural silicate material, foam lava or foamy volcanic rock is used.

5. The method according to claim 1 wherein as organic-containing residual material having a grained mineral portion, recovered paper material is used.

6. The method according to claim 1 wherein as organic-containing residual material having a grained mineral portion, sewage sludge is used.

7. The method according to claim 1 wherein prior to calcination, zeolite or bentonite is added to the mixture in an amount of maximum 5% by weight based on the amount of the mixture.

\* \* \* \* \*